United States Patent [19]
Fukuda et al.

[11] Patent Number: 6,112,130
[45] Date of Patent: *Aug. 29, 2000

[54] SEMICONDUCTOR PRODUCT MANUFACTURING EXECUTION SYSTEM AND SEMICONDUCTOR PRODUCT MANUFACTURING METHOD

[75] Inventors: Etsuo Fukuda; Hidehiro Okutani, both of Kanagawa-ken, Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/942,442

[22] Filed: Oct. 1, 1997

[30] Foreign Application Priority Data

Oct. 2, 1996 [JP] Japan ................................. 8-279864

[51] Int. Cl.⁷ ..................................................... G06F 19/00
[52] U.S. Cl. ............................................. 700/121; 700/105
[58] Field of Search ............................. 438/5, 4; 29/729; 364/468, 19; 700/121, 96, 97, 105, 108, 109, 115, 116, 99, 225, 226, 249, 112, 113; 702/84; 705/29

[56] References Cited

U.S. PATENT DOCUMENTS

| | | |
|---|---|---|
| 5,105,362 | 4/1992 | Kotani ................................. 364/468.15 |
| 5,164,905 | 11/1992 | Iwasaki et al. ...................... 364/468.19 |
| 5,375,062 | 12/1994 | Aoki ........................................... 700/99 |
| 5,432,702 | 7/1995 | Barnett ................................ 364/468.23 |
| 5,448,488 | 9/1995 | Oshima ............................... 364/468.28 |
| 5,495,417 | 2/1996 | Fuduka et al. ...................... 364/468.28 |
| 5,570,293 | 10/1996 | Tanaka et al. ...................... 364/468.28 |
| 5,591,299 | 1/1997 | Seaton et al. ....................... 364/468.28 |

*Primary Examiner*—William Grant
*Assistant Examiner*—Steven R. Garland
*Attorney, Agent, or Firm*—Oblon, Spivak, McClelland, Maier & Neustadt, P.C.

[57] ABSTRACT

A process flow, in which wafer processing conditions are described for forming a semiconductor through a plurality of processes, is formed for each lot in one type. A wafer processing is formed for each lot in one type of semiconductor in accordance with the process flow. When a different processing condition should be described according to a wafer in the lot in a certain process of the process flow, the process flow forming includes forming a plurality of different flows in that process by defining division/combination locations from a parent flow. When a faulty processing occurs in the wafer processing in a certain process, the process flow associated with that process is reformed, and a reprocessing is performed in accordance with the reformed process flow.

13 Claims, 7 Drawing Sheets

SEMICONDUCTOR PRODUCT MANUFACTURING EXECUTION SYSTEM AND SEMICONDUCTOR PRODUCT MANUFACTURING METHOD

BACKGROUND OF THE INVENTION

1. Field of the Invention

The present invention relates to a semiconductor manufacturing execution system and a semiconductor manufacturing method in a CIM (Computer Integrated Manufacturing) system.

2. Description of the Prior Art

A semiconductor manufacturing line includes a box in which a plurality of silicon wafers, referred to as a lot, are housed as a unit of distribution. A CIM system has the primary function of managing progress of flow of this box. Semiconductor manufacturing is achieved through hundreds of processing steps referred to as a process for producing a finished semiconductor product. This process can be an oxidation process, etching process, a lithography process, and the like. These processes are integrated so as to produce a semiconductor product.

Information regarding such a series of processes, their order, and processing conditions are referred to as process flow information. In accordance with this process flow information, the lot is moved through the manufacturing process. However, the process flow differs relative to each product. That is, the method of process integration and the processing conditions for each process normally differ relative to making different products.

Recently, various user needs have caused increased demand for semiconductor memory type products. This demand has resulted in a tendency toward small-quantity production of multiple semiconductor or memory types. For a DRAM type memory, for example, the lot of one or a few types of DRAMs flows on one production line. The production of so many different product types requires that each lot includes only a few wafers instead of the usual twenty-five. Thus, a plurality of lots, each having a small number of wafers are required to be mixed-loaded and to be flowed together. Furthermore, for a trial manufacture line or the like, twenty-five wafers are processed by dividing the conditions of a certain process or the process is done again. Thus, the flexibility of the process flow information for dividing the conditions and for adding another process is regarded as more important than providing for mass production.

In a conventional semiconductor manufacturing execution system, one process flow corresponds to one type (kind) of product. However, a plurality of lots are present each corresponding to the one type of product. For example, in a DRAM mass-production plant, as many as thousands of lots are sometimes present each of the one type.

The progress of these lots of one type are managed in accordance with one process flow information associated with the one type in the execution system.

FIG. 1 is a block diagram showing a relationship between a lot and the corresponding process flow in manufacturing the one conventional type of product. For example, one process flow information is defined corresponding to one type of product. The process flow information comprises a plurality of processes. The process flow is given a processing order relative to such processes and processing conditions (such as a recipe) for the processing steps in each such process. A plurality of lots are allocated to the process flow on the system. A memory, in which a location of a lot relative to a current process of the process flow can be described, is prepared for the lots on the system. Whenever the processing is completed relative to a process in the process flow, next process information is acquired from the process flow information for the next process to be performed.

In such a manner, the current progress of each lot in the process flow can be managed on the execution system.

Such a managing method of lots passing through one process flow corresponding to one type of product being made causes some problems. That is, even if only one of the lots shown in FIG. 1 is requested to change its processing condition, the conditions of all the lots are changed. In such a managing system, a complete management of all the lots is impossible. For example, assume that the one type of product being produced requires one hundred processes. At a process number 50, shown in the process flow for the tenth lot, for example, a faulty oxide film is produced. Therefore, the condition of the process number 50 is changed, and hence the process number 50 is changed into a process number 50a. Then, an error occurs. Namely, although the following lot must be processed in accordance with the process flow including the condition of process number 50, it is processed under the processing condition of the process flow having the modified process number 50a.

FIG. 2 is a model diagram illustrating the relationship between the process flow and the lot in the execution system of a certain type. The process flow includes the order of the processes, each process number, and process content information. The same processing is performed for each lot. Lots #1 and #2 shown in this drawing are managed relative to one process flow. The current location of processing relative to that process flow is such that the lots #1 and #2 are located in process 4 and process 3, respectively. Each lot can identify its own location, but cannot recognize its behavior.

Assume that a particular lot alone is erroneously changed. When a form or the like is statistically totalized, the totalization must be carried out in consideration of this particular lot.

In addition, when the processing in a certain lot does not succeed as to a particular process of the process flow and the processing is done again, the process cannot be added to this lot alone as is the case with the aforementioned condition. It is also impossible to define the allocation of a divided process flow or the like for each lot. That is, the managing method by one process flow corresponding to one type of product has difficulty in the setup of a different condition for each lot and the addition/elimination of a process.

SUMMARY OF THE INVENTION

It is an object of the present invention to provide a semiconductor manufacturing execution system and a semiconductor manufacturing method in which a plurality of process flows can be used for making one type of product thereby allowing accurate process management to be possible.

In order to achieve the above object, the present invention provides a semiconductor manufacturing execution system which comprises means for forming, for each lot relating to one type of product, a process flow in which wafer processing conditions are described for forming a semiconductor through a plurality of processes, and means for wafer-processing for each lot of one type of semiconductor product in accordance with the process flow.

In a preferred embodiment of the present invention, when a different processing condition should be described according to a wafer in a lot in a certain process of the process flow, the process flow forming means forms a plurality of different flows in that process by defining division/combination locations from a parent flow.

According to this mode, a flexible process flow can be formed.

In the preferred embodiment of the present invention, when faulty processing occurs in processing related to a certain process by the wafer processing means, the process flow associated with that process is reformed and the wafer processing means performs a reprocessing in accordance with the reformed process flow.

In the preferred embodiment of the present invention, the process flow forming means forms the process flow by the use of an installed editor program.

In the preferred embodiment of the present invention, the process flow forming means forms a master process flow end forms the process flow for each lot from the master process flow.

In the preferred embodiment of the present invention, each lot is managed relative to a memory in which a location of a current process can be described.

In the preferred embodiment of the present invention, whenever the processing is completed in a given process, next process information from the process flow is stored in the memory.

In the preferred embodiment of the present invention, the system further comprises processing means for storing and managing the process flow formed by the process flow forming means.

In the preferred embodiment of the present invention, the processing means manages a current progress status of each lot in accordance with the information stored in the memory.

In order to achieve the above objects, the present invention provides a method of manufacturing a semiconductor which comprises the steps of forming, for each lot of one type of product, a process flow in which wafer processing conditions are described for forming a semiconductor product through a plurality of processes, and wafer-processing for each lot of one type of semiconductor product proceeds in accordance with the process flow.

In the preferred embodiment of the present invention, when a different processing condition should be described according to a wafer in a certain lot in a certain process of the process flow, the step of forming the process flow includes forming a plurality of different flows in that process by defining division/combination locations from a parent flow.

In the preferred embodiment of the present invention, the step of wafer processing includes processing the corresponding wafer in accordance with a plurality of different defined flows when the division location is recognized in a certain process in the process flow.

In the preferred embodiment of the present invention, when faulty processing occurs in a step of wafer processing in a certain process of the process flow, the step of wafer processing includes reforming the process flow associated with that process and performing a reprocessing in accordance with the reformed process flow.

The nature, principle and utility of the invention will become more apparent from the following detailed description when read in conjunction with the accompanying drawings.

DETAILED DESCRIPTION OF THE PREFERRED EMBODIMENTS

Embodiments of the present invention will be described below with reference to the accompanying drawings.

Figure 1:
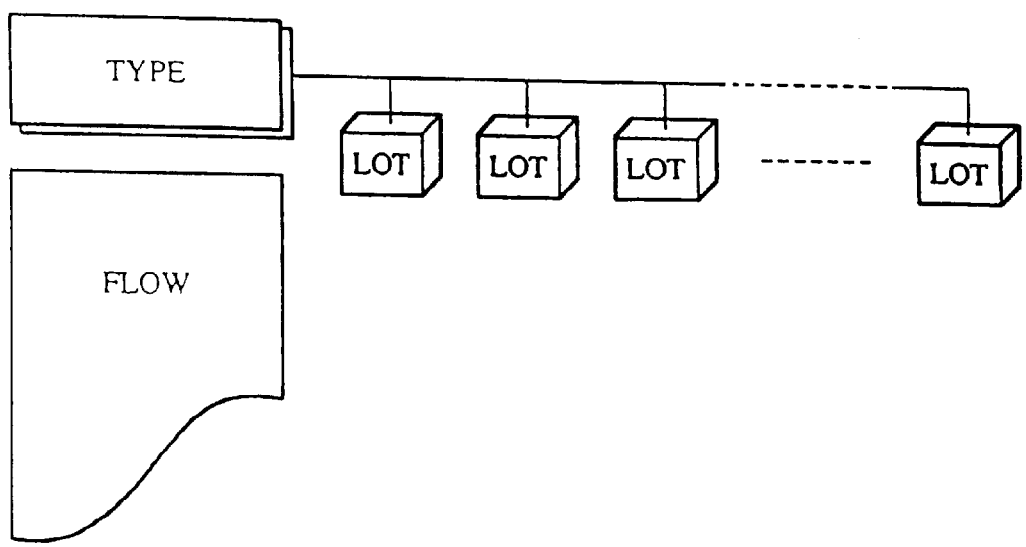
FIG. 1 is a model diagram showing a relationship between a process flow and a lot for one conventional type of product.
Figure 2:
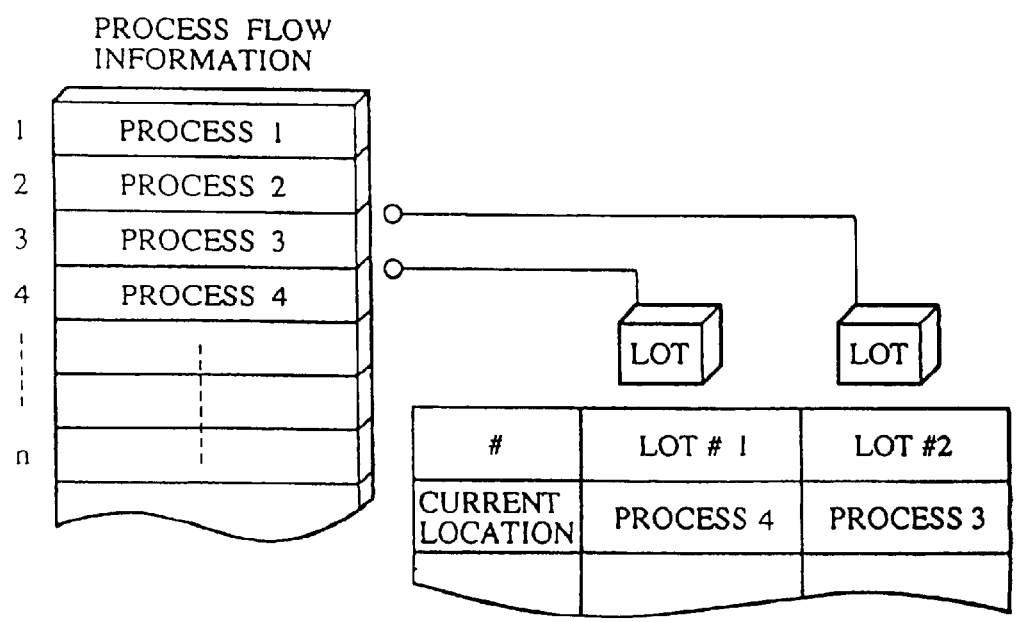
FIG. 2 is a model diagram showing a relationship between a process flow and a lot for one conventional type of product.
Figure 3:
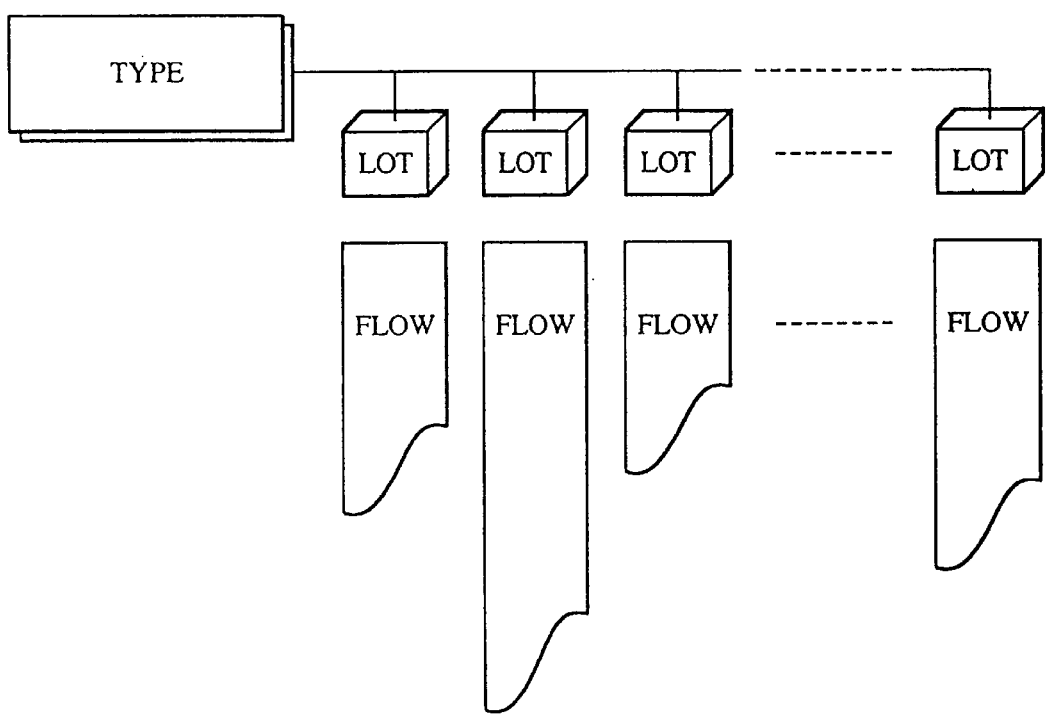
FIG. 3 is a model diagram showing a relationship between a process flow and a lot for one type of product according to the present invention.

FIG. 3 is a block diagram showing a relationship between a lot and a process flow for one type of semiconductor product. The lot comprises a plurality of wafers, the maximum number of which depends on a capacity of a carrier for housing the wafers. Typically, twenty-five wafers can be housed in the carrier. In this case, one lot may be so constructed that any number of wafers are grouped, as long as the number of wafers is 25 or less. That is, the lot is a unit for managing progress relative to an execution system. The lot is not equal to the carrier. The carrier is an actual container for carrying at least one lot. As long as one lot comprises less than twenty-five wafers, a plurality of lots may be present on the carrier.

As shown in FIG. 3, one process flow information is defined corresponding to one lot of one type of product. The process flow information relates to a plurality of processes as is the case with the prior-art information. The process flow includes a processing order of the processes in the flow and conditions (such as a recipe and a control variable) for the processing in each such process. A memory, in which a location of current process can be described, is prepared for the lots on the system. Whenever the processing is completed relative to a given process of the flow, next process information is acquired from the process flow information. In such a manner, a current progress status of each lot can be managed relative to the execution system.

The aforementioned terms will be described hereinafter. The lot means the unit of tracking the progress of the process flow. The lot comprises a collection of wafers. The wafer means a minimum unit of semiconductor material undergoing handling. A plurality of chips are formed on each wafer.

The carrier means the unit that carries one or more lots. The carrier, thus, is the container for holding a plurality of wafers that comprise the one or more lots. Accordingly, the lot and the carrier are quite different from each other. During the processing in any given process, the wafers are removed from the carrier. After the processing, the wafers are returned to the carrier. The process means the collection of processing steps which can be performed using in a single device or, as with PEP (Photo Engraving Process) those steps are carried out using a plurality of devices. However, if an operator is not conscious of respective set values of the devices in such processing, a plurality of devices can be considered as one device. Thus, process flow is described as a kind of process and its order, all of the process flows comprise at least two processes, that is, an introduction and a discharge.

Figure 4:
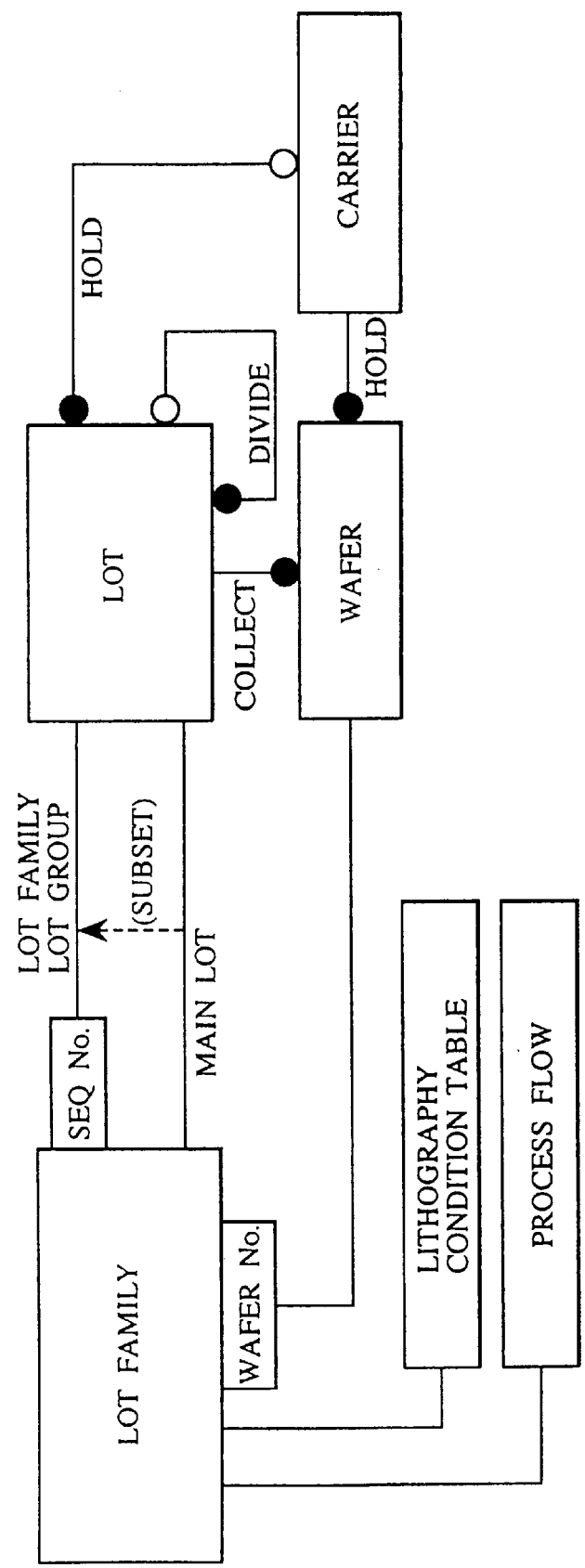
FIG. 4 is an object model diagram showing a relationship among a lot, a wafer and a carrier according to the present invention.

FIG. 4 is an object model diagram showing the relationship among the carrier, the lot and the wafer. The process flow information is defined corresponding to this lot. In this embodiment, for example, lithography condition table information is added to the process flow information as information. The type and lot number (classified by a kind of lot) are defined as header information of the process flow information. This header information defines which type the process flow belongs to. The drawing shows the lot having a predetermined process flow and lithography condition table information. The lot is uniquely determined by a kind-of-lot classification. As shown in FIG. 3, the process flow is allocated to each lot. Accordingly, the process flow information to be added to each lot, even those within the same type, can differ.

In each of drawings, a black dot is shown at the end of a connecting line when one or more line(s) is present. A white dot is shown when zero or one line is present. When the line does not have the black or white dots, one line is present.

An expression as shown in FIG. 4 is referred to as an OMT (Object Model Technology) method.

Figure 6:
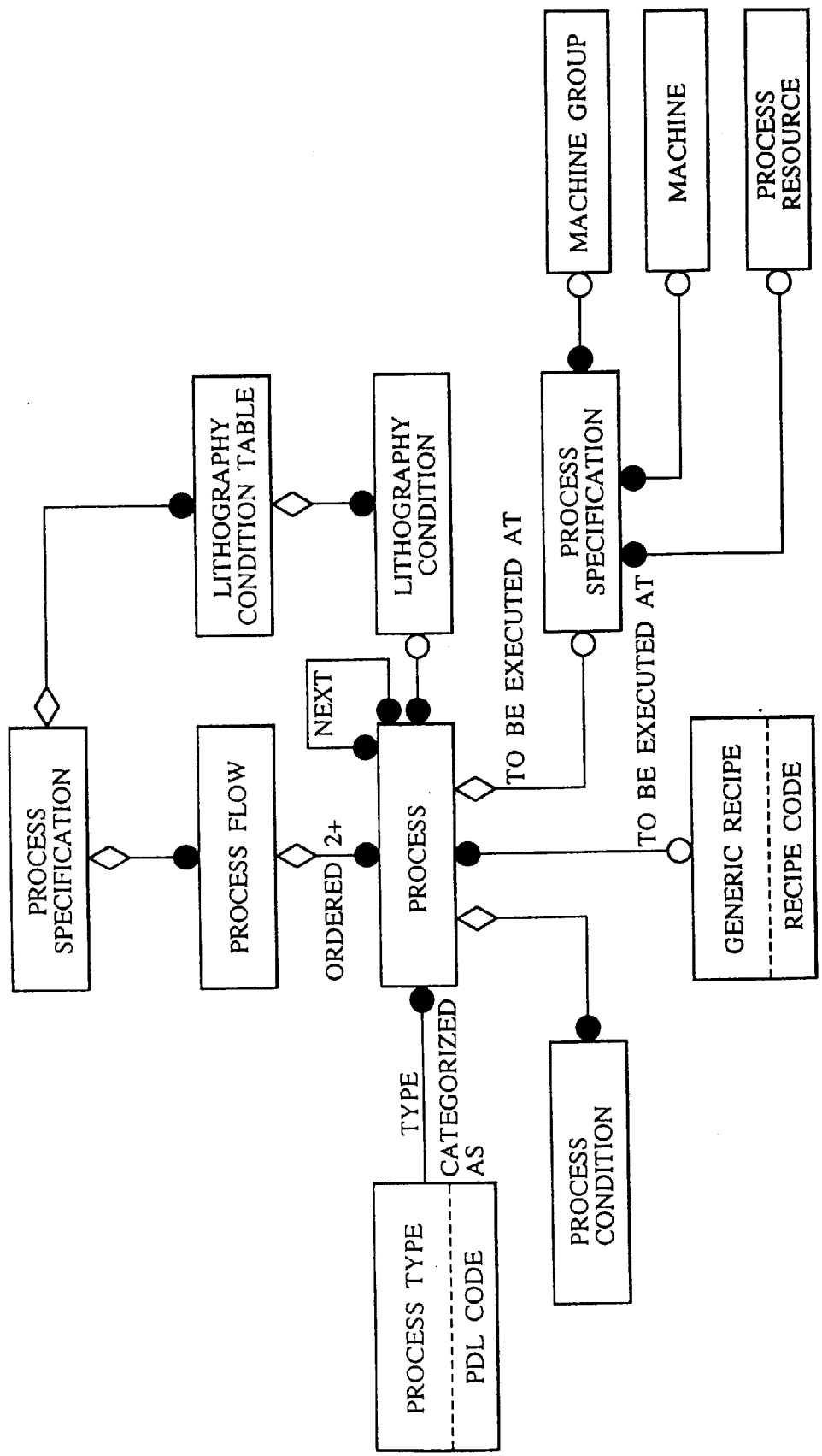
FIG. 6 is an object model diagram of a process flow according to the present invention.

FIG. 6 is the object model of the process flow. The process flow is obtained in accordance with this model. The process flow is formed by a process specification. A lithography condition table is added to this embodiment. Here, the process flow can be divided and combined.

The process specification (process flow master) comprises one or more process flow(s). Each process flow comprises at least two processes (an introduction process plus a discharge process). The process flow describes the kind of process and its order. In view of the division and combination, the order of process is not linear. That is, one process may have two or more following processes. Two or more processes may have one following process. One process can comprise a plurality of process conditions. For example, an oxidation process has one or more process condition(s), such as a temperature, a film thickness, and gas used. One process can also have plural kinds of recipe codes. It should be noted that some processes can have no logic recipe code while others can have a plurality of recipe codes, such as with a device which can allocate an amount of dose, such as an ion implantation device which can use a plurality of recipes in one process.

Figure 5:
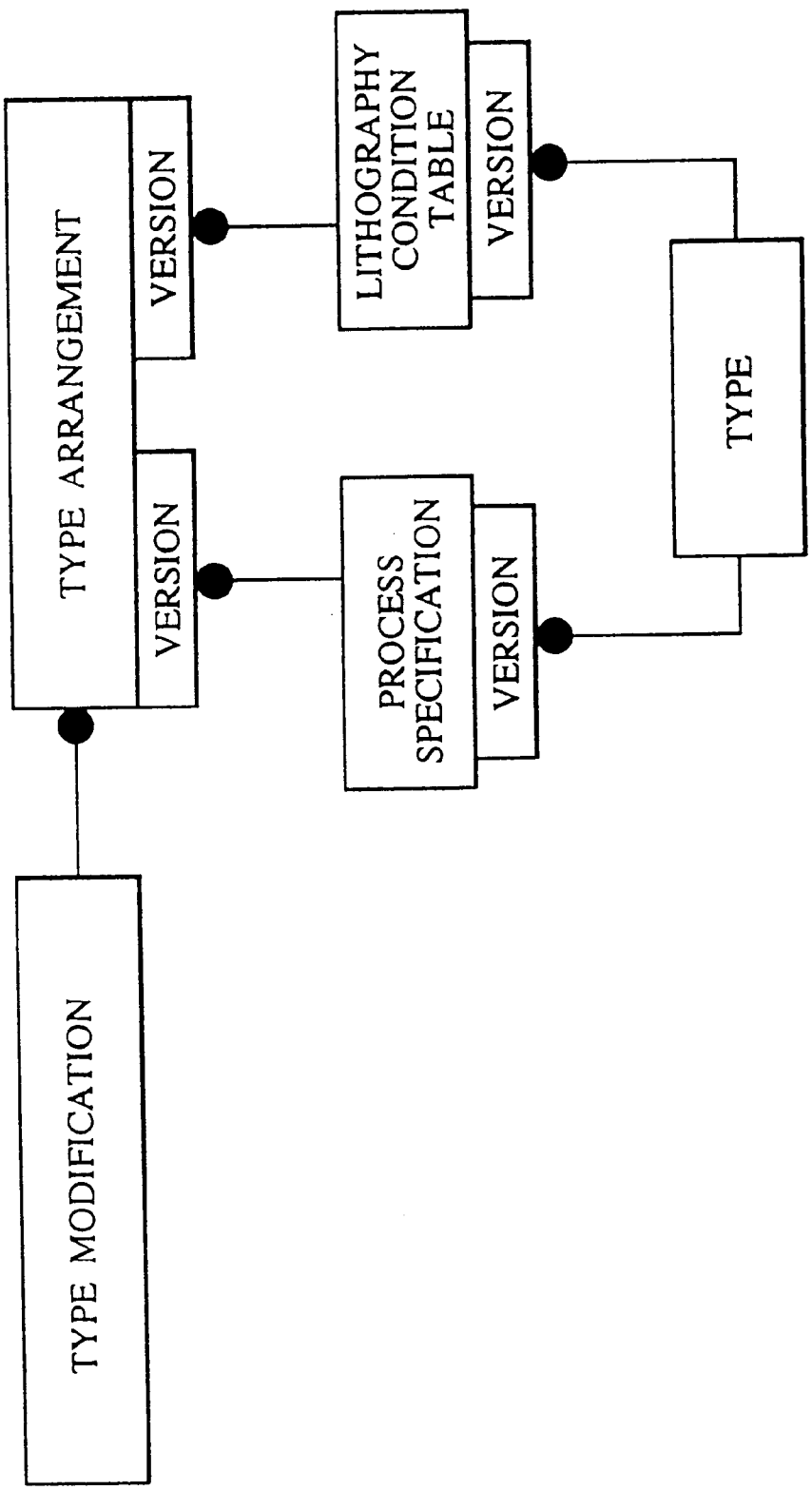
FIG. 5 is an object model diagram showing a relationship between a type of product and a Process specification according to the present invention.

When processing conditions are required to be managed together with one another as is the case of a lithography process, this is done. This data is referred to as the "lithography condition table." The process specification is provided with one or more lithography condition table(s). This table comprises one or more lithography condition(s). The relationship between this process specification and the type is shown in the object model diagram of FIG. 5.

The process flow allocated to a certain lot is defined as a "parent." Corresponding to this parent process flow (hereinafter referred to as a parent flow), a "child" process flow (hereinafter referred to es a child flow) can be defined. For example, a divided process flow (hereinafter referred to as a divided flow) and a redone process flow (hereinafter referred to as a redone flow) correspond to the child flow. The definition of child flow and corresponding dividing/combining locations from the parent permits the definition of the divided and redone flows within one lot. Of course, a wafer number must be defined for the child flow.

Figure 7:
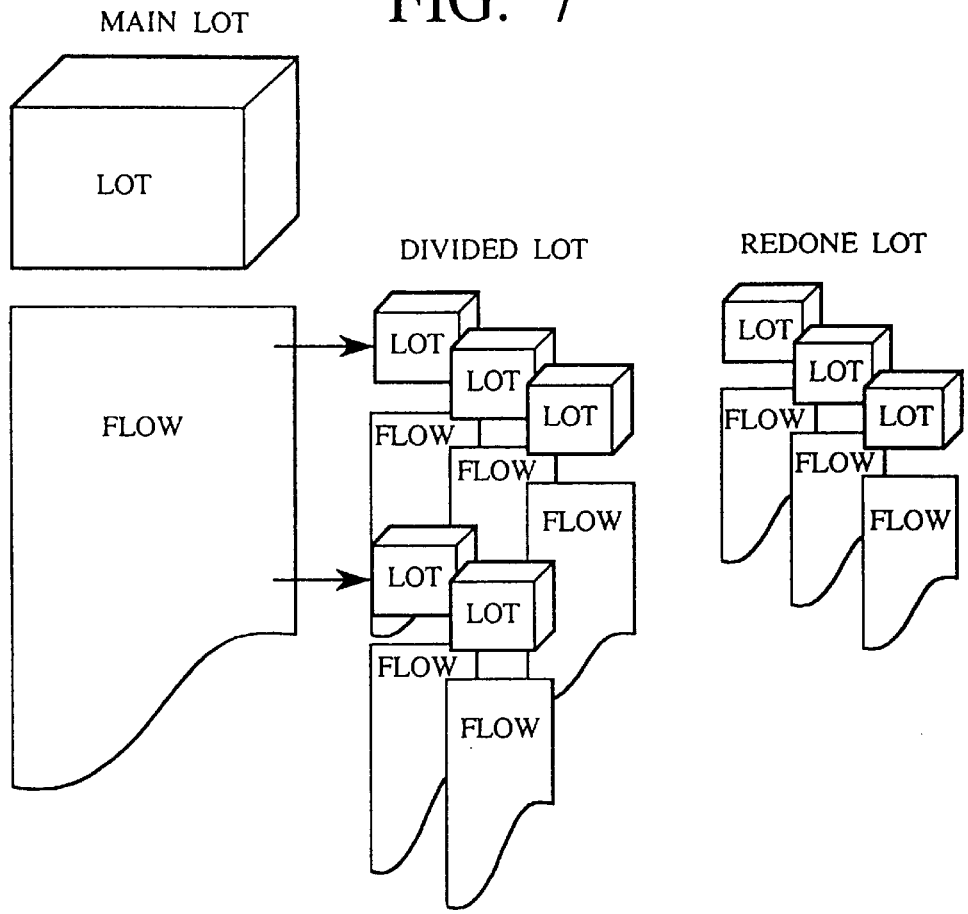
FIG. 7 is a model diagram of a lot family according to the present invention.

FIG. 7 shows an image diagram of this idea. That is, when the flow can be attached to the lot, a "lot family" is formed by the parent flow and one or more child flow(s). A main lot is present. This main lot is allocated to the parent flow. This parent flow is divided into the child flows so that the redone flows are formed. The lots are allocated to these redone flows so as to form the lot family.

Moreover, for example, on a DRAM manufacturing line, when the same process flow information and many lots are present, a conventional managing method using one type/one process flow information is appropriate. The present invention can be also applied to this case. For the type of product, the process flow information is defined to be the master (this is the same as a conventional idea). This parent process flow information is duplicated so as to also define the process flow information for each lot. In such a manner, the same master is used so that all the same process flow information is attached to each lot. Accordingly, the present invention is applicable to lot progress management on a single type line. When a version number is provided for the parent process flow information so as to change the master, this version number is changed so as to make the difference in each process flow information clear.

Next, a semiconductor manufacturing execution system of the present invention will be specifically described with reference to FIGS. 8, 9 and 10.

Figure 8:
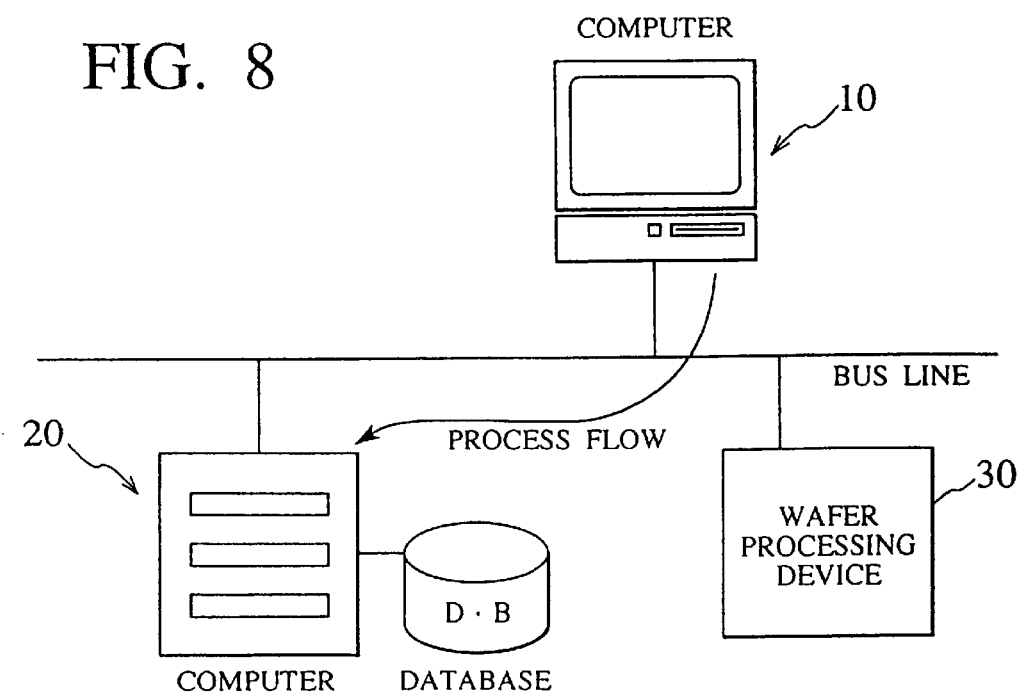
FIG. 8 is an illustration showing a construction of a semiconductor manufacturing execution system according to the present invention.

As shown in FIG. 8, the semiconductor manufacturing execution system comprises computers 10, 20 and a wafer processing device 30 (for example, an ion implantation device), each connected to a bus line. In practice, a plurality of wafer processing devices 30 are generally provided.

The operator uses an editor mounted on the computer 10 so as to form the process flow information for each lot. In this process flow information, division and combination information or the like is previously defined. For example, the dividing location, the combining location, the number of divisions, the divided flow and the wafer number to be processed in that flow are defined (see FIG. 9). The process flow information, which is formed by the operator by the use of the computer 10, is allowed to correspond to each lot, as shown in FIG. 3. The information is stored in a database of the computer 20 which manages the lot progress. More specifically, the process flow information includes operation instruction contents and managing items of various manufacturing data. When the processing is actually performed in the wafer processing device 30, the process flow information is read corresponding to each lot so as to be transmitted to the wafer processing device 30. The processing is then performed based on the condition, such as a recipe, contained in the information.

Figure 9:
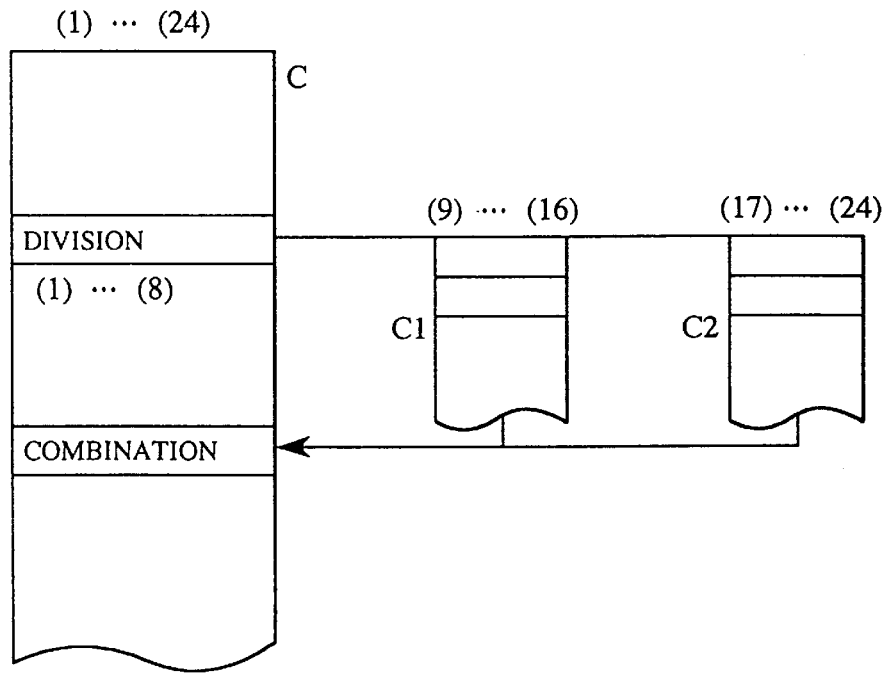
FIG. 9 is a model diagram illustrating a divided process flow according to the present invention; aid

FIG. 9 is a model diagram showing a main process flow C and divided flows C1, C2, that is, the child flows divided from the main process flow C. The main process flow C manages the main lot (not shown), for example, comprising twenty-four wafers. In the main lot, the process proceeds in accordance with the process flow information. In the process having a predetermined process number, the wafers of wafer numbers (9) through (16) are divided into sub lots. The divided flow C1 is allocated to these sub lots. In the same process, the wafers of wafer numbers (17) through (24) are divided into other sub lots in the same manner. The divided flow C2 is allocated to these sub lots. The wafers of wafer numbers (1) through (8) belong to the main lot and are managed by the main process flow C so as to follow the processing in the main process.

In the process of the further proceeding process number from the aforementioned predetermined process, the previously divided wafers of wafer numbers (9) through (24) flow together. From thereon, they belong to the main lot and are managed by the main process flow C so as to follow the main process.

Each lot has a memory in which the current process location can be described. Whenever the processing is completed relative to a process, next process information from the process flow is stored in the memory. In the computer 20, the current progress status of each lot is managed in accordance with the information described in the memory.

Figure 10:
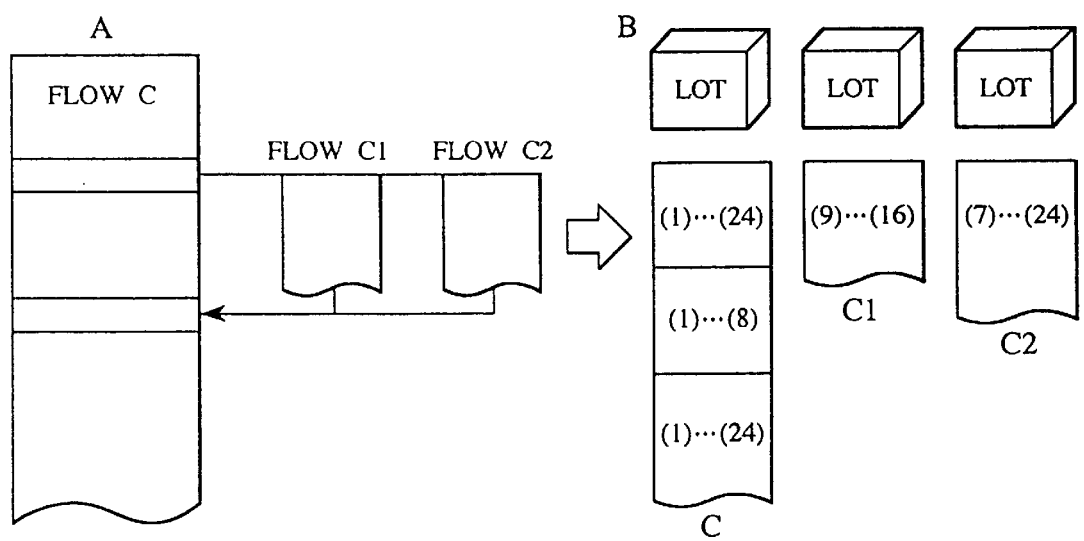
FIG. 10 is a model diagram illustrating an operation of formation of a divided child flow.

FIG. 10 shows FIG. 9 in detail.

First, in the execution system, progress is managed in accordance with the processing order in the flow C. For example, a dividing process is reached at a process number 4, where the lots are generated in the predefined divided flows C1 and C2. Wafer information is then added to these lots. In the main process flow C, the wafer information alone is changed. For example, when a combining process is reached at a process number 8, the child flow is combined to the main process flow C.

A divided flow can be formed as needed. That is, the divided flow is formed, when the manufacturing depends on a manufacturing device, when it is known that the dividing process is present prior to the formation of process flow or the like.

Each case will be described below.

The case where the manufacturing depends on the manufacturing device is as follows. The process is managed by the process flow, where each wafer in the lot can be differently processed. In this process, different manufacturing devices may be used for each wafer, regardless of the processing of the same process number. For example, a manufacturing device A1 is used for a wafer group A (wafer numbers 1 through 12) so as to perform a wafer processing. A manufacturing device A2 is used for a wafer group B (wafer numbers 13 through 24) so as to perform a different wafer processing. In this case, a sub lot is formed with twelve wafers of the wafer group B. The divided flow formed from the aforementioned process flow is allocated to this sub lot for management.

The case where the dividing process is present prior to the formation of process flow is as follows. One example is that, for each wafer, some processing includes a preprocessing while other processing does not include the preprocessing, regardless of the process number, when the process is managed by the process flow, or where the wafer in the lot is processed. For example, for the wafer group A (wafer numbers 1 through 12), the preprocessing is done in a predetermined process. For the wafer group B (wafer numbers 13 through 24), the preprocessing is not done. In this case, the sub lot is formed with the twelve wafers of the wafer group B. The divided flow formed from the aforementioned process flow is allocated to this sub lot for management.

On the other hand, in the following case, management is achieved by the above-described redone flow.

One example is that, some wafers are found not to be good, when the process is managed by the process flow, after a wafer in the lot is processed.

For the divided flow, it is appreciated that the flow should be divided before the formation of process flow. Accordingly, programming can be previously input. However, since the redone flow is generated during the process, the flow is divided so as to form the sub lot after the generation of the redone flow.

In fact, the process flow is formed by the editor installed in the computer 10.

The editor is a program which can describe the processes one by one. The description of each process includes a name of the process, processing conditions (such as a kind of processing, a temperature, a time, a film thickness, or a combination of variables that differs between each process), the recipe code, a device group, or the like. In order to indicate the process that "an oxidation oven is used so as to form an oxide film of 1000 Å (angstrom) in thickness at a temperature of 900° C. in an atmosphere of $O_2$ (oxygen) gas," one example of this description is as follows:

OX:TEMP=02, THICK=1000

This description is provided using the name of the process and the processing condition(s) for that process, thereby forming the "process flow." In the current device, the number of processes in the process flow can be hundreds of processes as described above.

For a trial manufacture line or the like, once the process flow is formed, the process flow is usually used only once in order to be used for the allocation of conditions or the like. Thus, for the registration of process flow on a CIM, the aforementioned editor is used so as to form one flow. A name of the product is given to the flow so as to achieve registration on the CIM. As described above, the editor is present on the computer 10 possessed by each engineer. Each editor is free to describe the flow and to register the flow on the CIM.

On the other hand, in a mass-production plant, a large number of lots are present which use the same flow derived from one master process flow. In this case, if the flow were to be formed for each lot, operation would be difficult. Therefore, the process flow formed by the aforementioned editor is registered as the "master process flow." This flow is copied so as to form the flow for each lot. When the flows of each lot are formed by a certain parent process flow in this manner, all the flows become the same flow. The flows appear to be one type/one flow.

Since each lot of the execution system according to the present invention is provided with the process flow, each lot can recognize its behavior.

One process flow information is defined corresponding to one lot, thereby allowing changes in conditions for each lot, the addition/elimination of a process, flow division and flow redoing. Such a lot managing form is effective in a trial manufacture line including many editions of conditions, changes in flow, and allocations of conditions. The execution system supports this function, thereby allowing a considerable reduction in the labor required for changing conditions, the flow division, or the like.

It should be understood that many modifications and adaptations of the invention will become apparent to those skilled in the art and it is intended to encompass such obvious modifications and changes into the scope of the claims appended hereto.

What is claimed is:

1. A semiconductor product manufacturing execution system comprising:

a single carrier configured to carry a plurality of lots that can be mingled together on the carrier, each lot including any number of semiconductor wafers, with all of the wafers in a lot carrying information indicating a common lot attribute shared by all of the wafers of that lot;

means for forming, for each lot, a process flow in which wafer processing conditions are described for forming a semiconductor product through a plurality of processes; and means for wafer-processing each said lot in accordance with said process flow.

2. The system according to claim 1, wherein when a different processing condition is described for each wafer in each lot in a certain process of the process flow, said process flow forming means forms a plurality of different flows in the certain process by defining division/combination locations from a parent flow.

3. The system according to claim 1, wherein when a faulty processing step occurs in a certain process of the process flow, said process flow forming means reforms a flow corresponding to the certain process and said wafer processing means performs a reprocessing in accordance with the reformed flow.

4. The system according to claim 1, wherein said process flow forming means forms said process flow by the use of an installed editor.

5. The system according to claim 1, wherein said process flow forming means forms a master process flow and forms the process flow for each lot from the master process flow.

6. The system according to claim 1, wherein said lot comprises a memory in which a location of a current process can be described.

7. The system according to claim 6, wherein whenever a certain process for each lot terminates, information on a next process is read from said process flow and is stored in said memory.

8. The system according to claim 7 further comprising processing means for storing and managing the process flow formed by said process flow forming means.

9. The system according to claim 8, wherein said processing means manages a current progress status of each lot in accordance with the information stored in said memory.

10. A method of manufacturing a semiconductor product, the method comprising the steps of:

forming, for each lot including any number of semiconductor wafers having a common lot attribute, a process flow in which wafer processing conditions are described for forming a semiconductor product through a plurality of processes; and wafer-processing each lot in accordance with said process flow after obtaining a lot from a common carrier carrying plural lots which can be mingled together, each semiconductor wafer of a lot being identified with respect to said common lot attribute.

11. The method according to claim 10, wherein when a different processing condition is described for each wafer in each lot in a certain process of the process flow, said step of forming the process flow includes forming a plurality of different flows in the certain process by defining division/combination locations from a parent flow.

12. The method according to claim 11, wherein said step of wafer processing includes processing each wafer in accordance with a corresponding flow out of the plurality of different flows when a division location is recognized in the certain process in the process flow.

13. The method according to claim 10, further comprising, when a faulty processing occurs in a certain process of the process flow, the step of reforming a flow corresponding to the certain process and wafer-reprocessing in accordance with the reformed flow.

* * * * *